United States Patent [19]
De Bie

[11] 3,785,427
[45] Jan. 15, 1974

[54] CASTING OF DEOXIDIZED COPPER
[75] Inventor: Edouard De Bie, Antwerpen, Belgium
[73] Assignee: Metallurgie Hoboken-Overpett, Brussels, Belgium
[22] Filed: Aug. 15, 1972
[21] Appl. No.: 280,917

[52] U.S. Cl. .............................. 164/154, 164/266
[51] Int. Cl. ............................................ B22d 1/02
[58] Field of Search ................. 164/4, 56, 150, 154, 164/266

[56] References Cited
UNITED STATES PATENTS
3,614,978  10/1971  Kosco .................................. 164/154
3,358,743  12/1967  Adams ................................. 164/154

Primary Examiner—J. Spencer Overholser
Assistant Examiner—John E. Roethel

[57] ABSTRACT

Apparatus comprising conductivity measuring probe for measuring the conductivity of copper casting, measuring apparatus for determining the difference between the measured conductivity and a predetermined conductivity, and means for producing a signal proportional to the difference and transmitting the signal to a regulator which regulates the amount of deoxidizer added to molten copper.

8 Claims, 2 Drawing Figures

CASTING OF DEOXIDIZED COPPER

This invention relates to the casting of deoxidized copper and more particularly to a process for the continuous measuring of the conductivity of a copper casting, for instance of a copper billet, or plate, cast either continuously or semi-continuously. It is known that conductivity is one of the important proporties of copper trade products and that this property diminishes according to an increase in the contents of impurities.

In copper which has been deoxidized, for instance by means of phosphorous, it is the phosphorous that will have the greatest impact on conductivity since the other impurities are limited to a few grams per ton.

Hence, there is a relation between the conductivity and the phosphorous-content; if the conductivity of a deoxidized copper is known, its phosphorous-content can be determined.

There is a well-known method for measuring the conductivity according to the principle of magnetic induction and Foucault currents.

In daily practice, a melting furnace supplies liquid copper to a holding furnace, which in its turn feeds a continuous casting plant. In order to obtain deoxidized copper, a deoxidizer, generally phosphorous or a cuprophosphorous alloy, is added, usually to copper flowing into the holding furnace. Such addition is done either continuously or discontinuously. The flow of deoxidizer is determined by the following parameters : quality required for the cast product, average casting flow, and average or probable oxygen content of the liquid copper leaving the melting furnace.

The quality of the product is controlled, after sawing and transport, at a control-station. The inspector of the continuous casting line controls the phosphorous contents of billets or the like by measuring regularly, for instance on one billet out of two, the conductivity by putting the conductivity measuring probe on a sawn surface of the billet and informs the casting operator step by step of the results, and the operator adjusts accordingly the phosphorous quantity added to the casting.

However rapid this method may be, it has several drawbacks, especially when billets are cast continuoulsy. The measuring is done discontinuously, and if the metal is not perfectly homogeneous the measuring might give a wrong idea of the average phosphorous content. Furthermore, the measuring is only done at a relatively far distance from the place where the casting is done, for instance several meters after the casting. Consequently, the phosphorous contents are checked with a considerable delay, especially when big sizes are cast, with the result that a divergence in the determination of the phosphorous addition involves several tons of rejects. It is therefore practically impossible to effect a subsequent control of the regularity of addition and efficiency of a reaction. Moreover, each measure entails sawing billet slices which must be recycled. The invention provides apparatus for controlling the addition of deoxidizer to molten copper during copper casting comprising a conductivity measuring probe for continuously measuring the conductivity of casting as it moves past the probe, measuring apparatus for determining the difference between the measured conductivity and a predetermined conductivity, and means for producing a signal proportional to the said difference and transmitting said signal to a regulator which regulates the amount of deoxidizer added to the molten copper.

The measuring is effected according to the invention on the skin of the piece of copper, no longer on a sawn surface of the piece of copper. Tests have shown that there is a difference between measurements obtained on the skin and those on the sawn surface of the copper.

This apparatus enables a continuous measuring of the conductivity of a continuously cast copper piece to be made; the measuring is effected at the exit of the casting line, after the copper piece has been cooled.

Preferably, the conductivity measuring probe is mounted on roller means adapted to contact the casting moving therepast during casting.

With the above-described apparatus, a measuring of the conductivity can be carried out much more rapidly, thus permitting a quicker reaction of the operator in the case of an anomaly in the phosphorous-content, to adapting that content to the conductivity control value. Since the tendency of the phosphorous-content is clearly registered, it is possible to anticipate overstepping the set phosphorous limits and to reduce thus the number of rejects.

The phosphorous addition can also be brought automatically under control of the conductivity measuring, for instance by making the measure act upon a dosage device, for instance upon a measuring feed hopper in which the phosphorous to be added to the liquid copper is stored.

Preferably, correction means are provided for automatically correcting the conductivity measured by compensating for the differences between the temperature recorded on the casting and the temperature chosen for a required conductivity value.

Preferably, the regulator is controlled by means for measuring the oxygen content of the molten copper before casting and means for measuring the flow of molten copper.

Preferably, the flow of molten copper is determined from the measurements of means measuring the flow of the solidified casting and means measuring the weight variation of the molten copper being cast in a holding furnace.

The invention will be further described with reference to an embodiment shown by way of example in the accompanying drawings, wherein :

FIG. 1 is a longitudinal cross-section of the continuous casting plant used in the present invention and.

Figure 1:
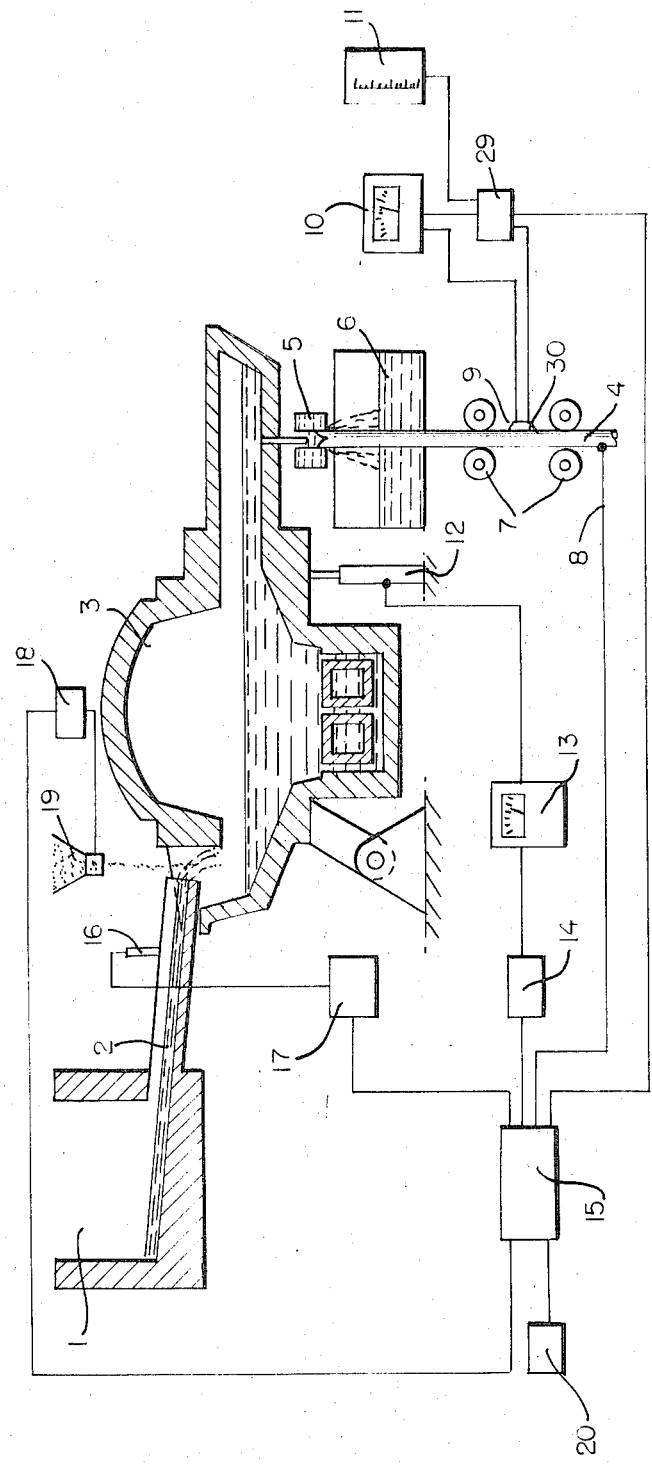

Referring to FIG. 1, a melting furnace 1 supplies liquid copper to a holding furnace 3 via a spout 2.

The copper is cast in a mould 5. The cast product 4 passes through a cooling tank 6 and is moved by means of extraction rolls 7.

The casting speed is measured at 8 and is transmitted to a regulator 15.

A conductivity probe 9 transmits a continuous signal to a measuring apparatus 10. The measuring apparatus 10 transmits a signal proportional to the conductivity to the recorder 11 and to the regulator 15.

The signal is previously amplified in an amplifier 29 where it undergoes a temperature correction produced by a temperature probe 30.

A probe 16, which is for measuring oxygen content and is dipped in the copper of the spout, transmits a continuous signal to a signal converter 17, which in its turn transmits the value of the oxygen content of the regulator 15.

Weighing apparatus 12 measures the weight of the holding furnace 3. A signal proportional to the weight of the copper contained in the said furnace is also transmitted to the regulator 15, via the measuring apparatus 13 and transmitter 14.

On the basis of these various measurements, the regulator 15 determines the flow of deoxidizer which is necessary in order to obtain the quality required, as set by a control 20. To this end, the regulator 15 acts for instance upon the speed of a driving motor 18 of the apparatus 19 which delivers the deoxidizer.

Figure 2:
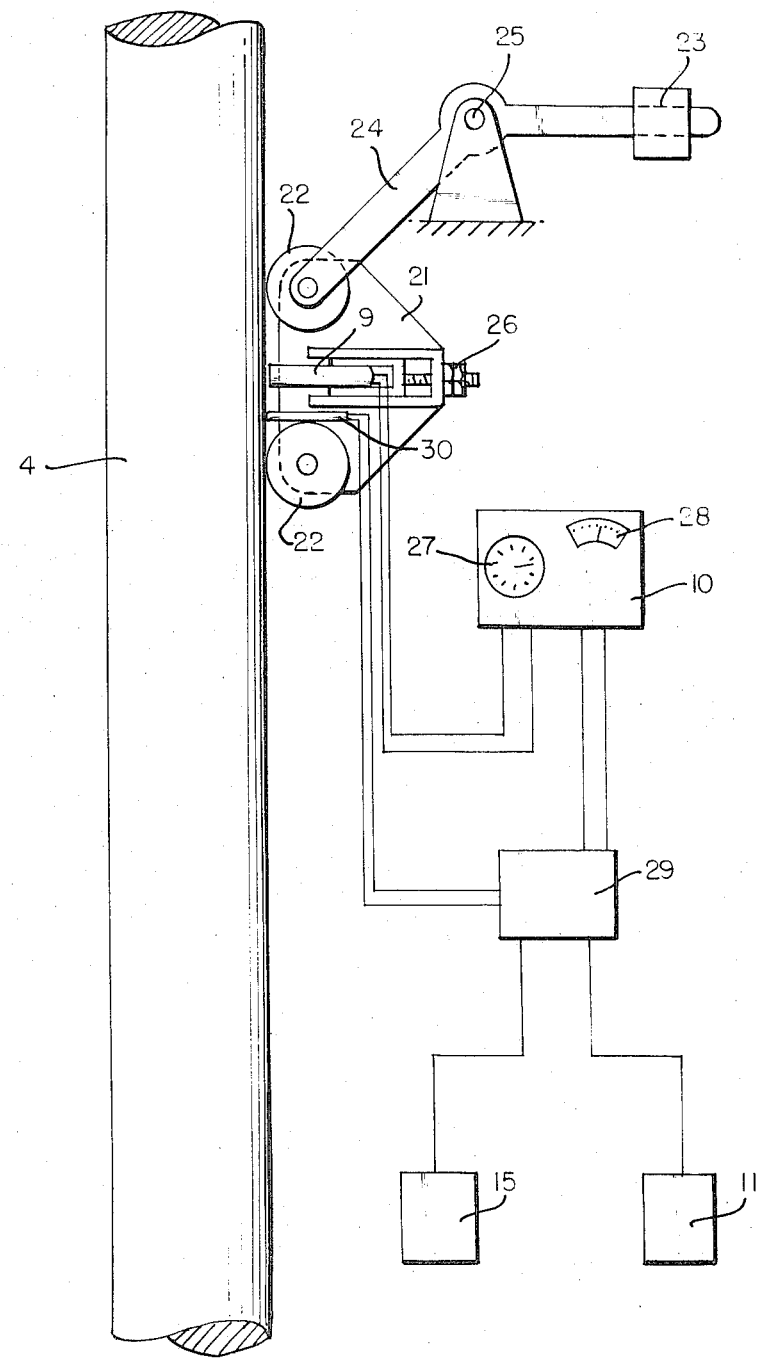
FIG. 2 is a diagrammatical vertical view of the main part of the device according to the invention.

In FIG. 2, a copper billet, the conductivity of which, and hence the phosphorous content, is measured, has been shown at 4.

The conductivity probe 9 is mounted on roller means in the form of a carriage 21, the wheels 22 of which rest upon the billet 4. The bearing pressure is obtained by the carriage's own weight and by a counterweight 23 provided on an arm or bar 24 which pivots about a fixed axis 25. The billet 4 can thus run smoothly against the carriage 21, and any vibrations caused by the casting table and the saw (not illustrated) are not transmitted to the measuring device.

The distance between the probe 9 and the billet 4 can be adjusted by means of nuts 26, so that the position of the probe 9 can be adapted to a billet of any diameter. The probe 9 is electrically connected to a conductivity measuring apparatus 10.

Under practical working conditions, the movement of a needle 28, which is mounted in the measuring apparatus 10, is proportional to the difference between the measured conductivity and a predetermined conductivity value set on a dial 27. If desired, the dial 27 may also be calibrated for phosphorous percentage content. A signal which is proportional to the movement of the needle 28 is amplified in an amplifier 29 and is transmitted, after temperature compensation by means of the temperature measuring probe 30, to the recorder 11 and to the regulator 15.

The probe 30, which is mounted on the carriage 21, measures the temperature of the billet 4 and enables compensation in the amplifier 29 of the signal which is proportional to the deviation of indicator 28 so that deviation is brought back to standard temperature conditions.

What I claim is:

1. Apparatus for controlling the addition of deoxidizer to molten copper during copper casting, comprising a conductivity measuring probe for continuously measuring the conductivity of casting as it moves past the probe, measuring apparatus for determining the difference between the measured conductivity and a predetermined conductivity, and means for producing a signal proportional to the said difference and transmitting said signal to a regulator which regulates the amount of deoxidizer added to the molten copper.

2. Apparatus as claimed in claim 1, wherein the conductivity measuring probe is mounted on roller means adapted to contact the casting moving therepast during casting.

3. Apparatus as claimed in claim 2, wherein the roller means is mounted on a pivoting arm carrying a counterweight for urging the roller means against the casting.

4. Apparatus as claimed in claim 1, comprising means for permitting the adjustment of the distance between the conductivity measuring probe and the casting in order to permit adjustment of the position of the probe to a casting of any shape.

5. Apparatus as claimed in claim 1, wherein the conductivity measuring probe is connected to means indicating the phosphorous percentage content in the copper casting.

6. Apparatus as claimed in claim 1, comprising correction means for automatically correcting the conductivity measured by compensating for the differences between the temperature recorded on the casting and the temperature chosen for a required conductivity value.

7. Apparatus as claimed in claim 1 wherein the regulator is controlled by means for measuring the oxygen content of the molten copper before casting.

8. Apparatus as claimed in claim 7, having means for measuring the flow of molten copper by measuring the flow of the solidified casting and means are provided for measuring the weight variation of the molten copper which is cast in a holding furnace.

* * * * *